(12) United States Patent
Tiphane et al.

(10) Patent No.: US 6,704,003 B2
(45) Date of Patent: Mar. 9, 2004

(54) ADAPTABLE INPUT DEVICE SUPPORT

(75) Inventors: Guy Tiphane, Atherton, CA (US); Samantha Moy, Livermore, CA (US)

(73) Assignee: Logitech Europe S.A. (CH)

( * ) Notice: Subject to any disclaimer, the term of this patent is extended or adjusted under 35 U.S.C. 154(b) by 173 days.

(21) Appl. No.: 09/738,587

(22) Filed: Dec. 15, 2000

(65) Prior Publication Data

US 2002/0126092 A1 Sep. 12, 2002

(51) Int. Cl.$^7$ ................................................ G09G 5/08
(52) U.S. Cl. ........................ 345/163; 345/156; 345/158
(58) Field of Search ................................. 345/156–167

(56) References Cited

U.S. PATENT DOCUMENTS

| | | | | |
|---|---|---|---|---|
| 6,031,522 A | * | 2/2000 | Strand | 345/163 |
| 6,111,563 A | * | 8/2000 | Hines | 345/166 |
| 6,373,468 B1 | * | 4/2002 | Leman | 345/163 |

FOREIGN PATENT DOCUMENTS

| JP | 08110834 A | * | 4/1996 | G06F/3/033 |
|---|---|---|---|---|

\* cited by examiner

*Primary Examiner*—Steven Saras
*Assistant Examiner*—Srilakshmi K. Kumar
(74) *Attorney, Agent, or Firm*—Townsend and Townsend and Crew LLP

(57) ABSTRACT

An input device includes a replaceable support for the user's hand which can be selected to provide improved comfort and support for the hand for operating the input device. The replaceable support allows the user to select a shell to fit his or her hand and to provide the desired functionality. In specific embodiments, the adaptable computer input device comprises a core module including an input element for a user to provide input to a computer. An outer shell is selected from a group of different outer shells which are detachably connectable to the core module to support a user's hand for manipulating the input element of the core module to provide input to the computer. The core module automatically detects operational information of the outer shell upon coupling of the outer shell with the core module and adapts operation of the core module to the outer shell connected thereto in response to detected operational information of the outer shell.

23 Claims, 3 Drawing Sheets

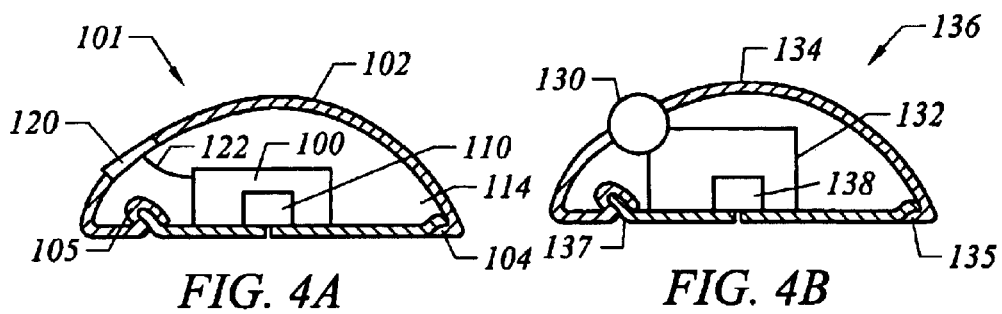
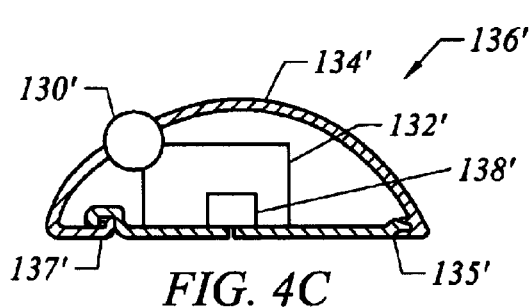
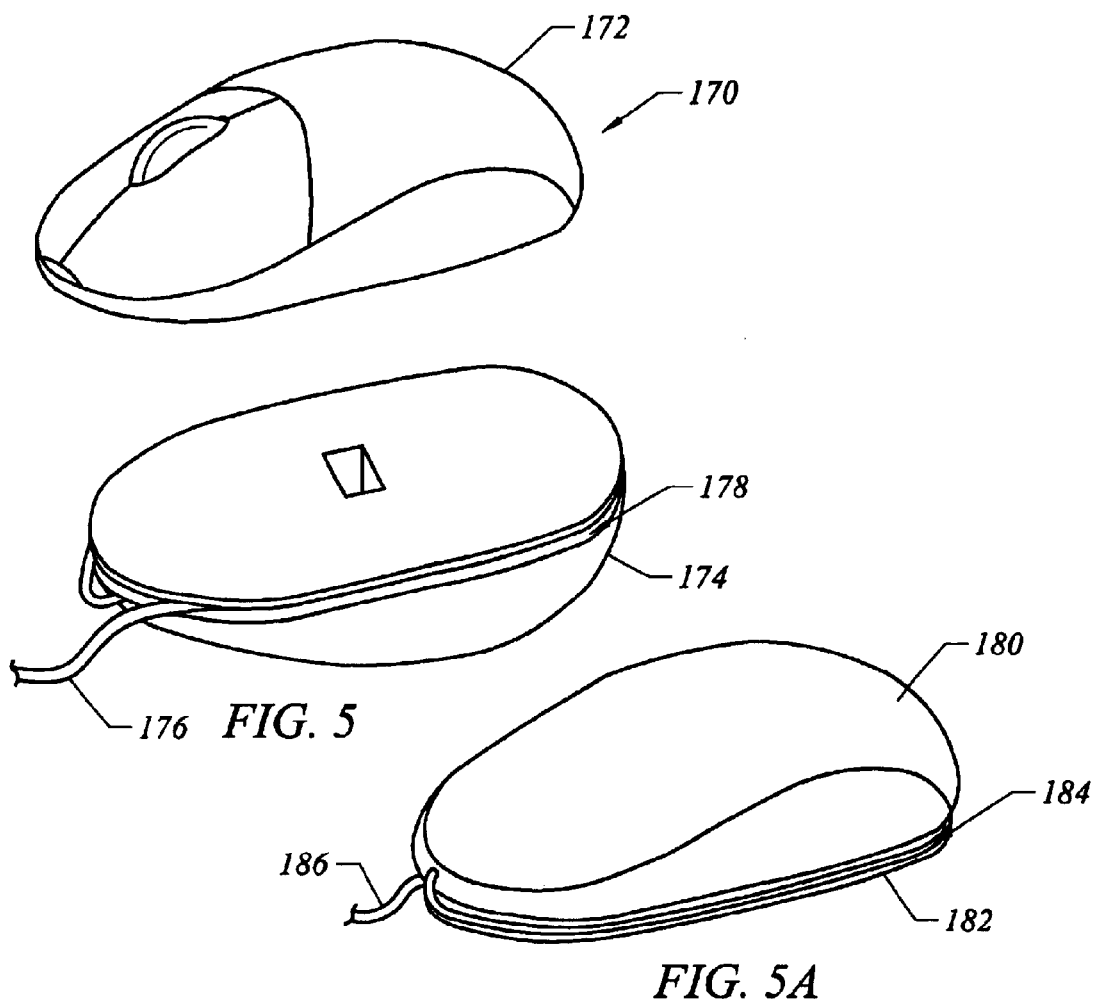

ADAPTABLE INPUT DEVICE SUPPORT

BACKGROUND OF THE INVENTION

The present invention relates generally to input devices and, more particularly to an adaptable input device such as an adaptable mouse.

Input or pointing devices are commonly used, for instance, to control cursor movement or manipulate objects on a computer screen, and to execute computer functions. Examples of input devices include computer mouse devices, trackballs, joysticks, and steering wheels. Input devices have different types, shapes, and sizes. Some are configured for a right-hand user or a left-handed user only, while others are more comfortable for hands having certain shapes and sizes and less comfortable for hands of other shapes and sizes. The use of input devices often involves highly repetitive hand and finger movements and positions. Providing comfort to the hands and fingers during use is of great interest to designers and manufacturers of such devices. Input devices having configurations that force the wrist, hand, and fingers of the user to assume awkward and stressful positions and/or movements are undesirable. Some of the awkward and stressful positions and/or movements may result when the input device is shaped, sized, or otherwise configured to provide a poor fit for the user's hand.

SUMMARY OF THE INVENTION

The present invention provides an input device having a replaceable support for the user's hand which can be selected to provide improved comfort and support for the hand in operating the input device. Certain shape and size characteristics of the support of the input device may be more desirable for a particular user's hand. The replaceable support allows the user to select a shell to fit his or her hand. In addition, different shells having different user-manipulable members may be adapted for use with the same core module, which detects the particular shell connected thereto and contains firmware or software that can adapt the input device to the particular shell. In some embodiments, the firmware or software is a universal firmware or software that can be adaptable to different input devices without modification or customization.

In accordance with an aspect of the present invention, an adaptable computer input device comprises a core module including an input element for a user to provide input to a computer. An outer shell is selected from a group of different outer shells which are detachably connectable to the core module to support a user's hand for manipulating the input element of the core module to provide input to the computer.

In some embodiments, the outer shell is detachably connected to the core module by a quick-release mechanism. The outer shell may be selected from a group of outer shells having different sizes and shapes. The outer shell may also be selected from a group of outer shells having different user-manipulable members disposed thereon which are operatively coupled with the core module to allow the user to interact with the core module.

In accordance with another aspect of the invention, an adaptable input device comprises a core module manipulable by a user to generate an input signal, and an outer cover detachably connected to the core module to support a user's hand for manipulating the core module to generate the input signal. The outer cover includes a cover identifying element and the core module includes a cover detection element which detects the cover identifying element of the outer cover upon coupling of the outer cover with the core module. The outer cover is replaceable by a second outer cover having a second cover identifying element which is detected by the cover detection element of the core module upon coupling of the second outer cover with the core module.

The cover detection element may comprise an optical element optically detecting the cover identifying element. Alternatively, the cover detection element and the cover identifying element may form a mechanism connection upon coupling of the outer cover with the core module. Further, the cover detection element and the cover identifying element may form an electrical connection upon coupling of the outer cover with the core module. In some embodiments, the core module comprises firmware which adapts operation of the core module to the outer cover connected thereto in response to detection of the cover identifying element by the cover detection element of the core module. The cover identifying element may identify one or more user-manipulable members associated with the outer cover.

In accordance with another aspect of the invention, a method of adapting a core module of an input device to different operations comprises selecting an outer shell from a group of outer shells which are detachably connectable to the core module of the input device. An outer shell is detachably connected to the core module to support a user's hand for manipulating the core module to generate an input signal. The core module automatically detects operational information of the outer shell upon coupling of the outer shell with the core module and adapts operation of the core module to the outer shell connected thereto in response to detected operational information of the outer shell. The method may further comprise disconnecting the outer shell and detachably connecting a second outer shell. The core module automatically detects operational information of the second outer shell upon coupling of the second outer shell with the core module and adapting operation of the core module to the second outer shell connected thereto in response to detected operational information of the second outer shell.

In accordance with another aspect of the invention, an input device comprises a core module manipulable by a user to generate an input signal, and an outer cover connected to the core module to support a user's hand for manipulating the core module to generate the input signal. The outer cover includes a cover identifying element and the core module includes a cover detection element which detects the cover identifying element of the outer cover upon coupling of the outer cover with the core module. The core module comprises firmware which adapts operation of the core module to the outer cover connected thereto in response to detection of the cover identifying element by the cover detection element of the core module. The outer cover may be detachably connected to the core module.

BRIEF DESCRIPTION OF THE DRAWINGS

FIG. 4a is a side cross-sectional view of a mouse device according to an embodiment of the present invention;

FIG. 4b is a side cross-sectional view of a mouse device according to another embodiment of the invention;

FIG. 4c is a side cross-sectional view of a mouse device according to another embodiment of the invention;

FIG. 5 is an exploded perspective view of a mouse device according to another embodiment of the invention;

FIG. 5a is a perspective view of another core module for the mouse device of FIG. 5;

DESCRIPTION OF THE SPECIFIC EMBODIMENTS

Figure 1A:
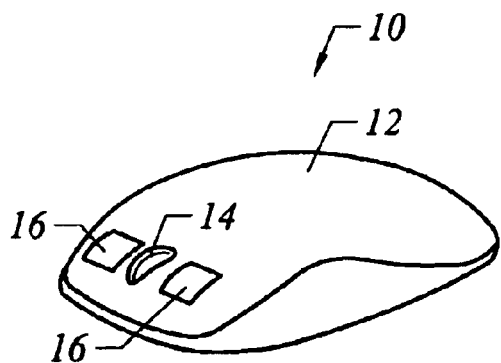
FIG. 1a is a perspective view of the outer shell of a mouse device.
Figure 1B:
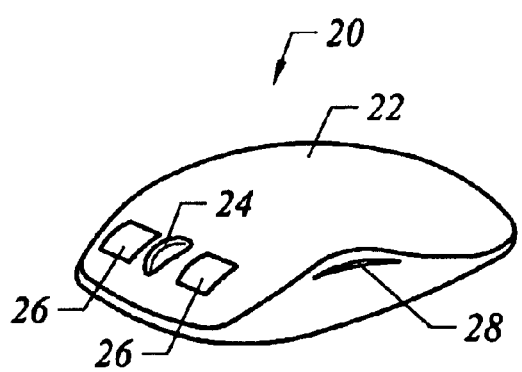
FIG. 1b is a perspective view of the outer shell of another mouse device.
Figure 2A:
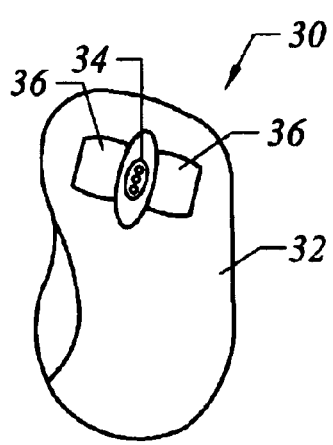
FIG. 2a is a top plan view of the outer shell of a right-handed mouse device.
Figure 2B:
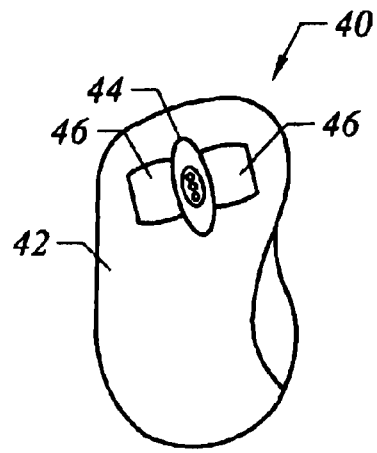
FIG. 2b is a top plan view of the outer shell of a left-handed mouse device.

FIG. 1a shows a mouse device 10 having an outer shell or cover 12, a roller 14, and a pair of buttons 16. FIG. 1b shows another mouse device 20 which also has an outer shell 22, a roller 24, and a pair of buttons 26. The first mouse 10 has a longer shell 12 which may be more suitable for a supporting longer hand. The second mouse 20 has a wider shell 22 which may be preferred by a user with a wider hand. The shell 22 also includes lift edges 28 on both the thumb side and the small finger side to facilitate lifting and repositioning of the mouse 20 by the thumb and small finger. The outer shell supports the user's hand for manipulating the input device to generate an input signal to the computer. By providing replaceable shells with different shapes and sizes, different users can adapt the mouse to their general work style and preferences, or to specific, temporary needs. In another example, FIG. 2a shows a right-handed mouse 30 having a shell 32 shaped for supporting the right hand, while FIG. 2b shows a left-handed mouse 40 having a shell 42 shaped for supporting the left hand. The mouse 30 includes a roller 34 and a pair of buttons 36. The mouse 40 includes a roller 44 and a pair of buttons 46.

Figure 3A:
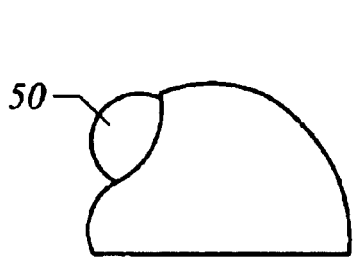
FIG. 3a is an elevational view of a trackball device.
Figure 3B:
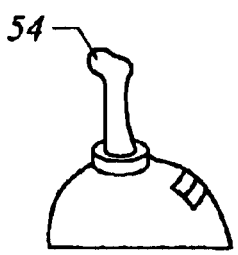
FIG. 3b is an elevational view of a joystick device.
Figure 3C:
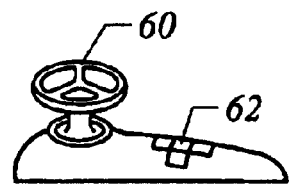
FIG. 3c is an elevational view of an input device with a steering wheel and a touch pad.

The rollers and buttons shown in FIGS. 1a–2b are user-manipulable members that are controlled by the user to provide input to the mouse devices to generate signals for performing computer functions such as moving a cursor, manipulating objects on a computer screen, or executing computer functions. Examples of other user-manipulable members include a trackball 50 shown in FIG. 3a, a joystick 54 shown in FIG. 3b, and a steering wheel 60 and a touch pad 62 shown in FIG. 3c.

The different shells can be detachably connected to a core module 100 of an input device as shown in FIG. 4a. Any suitable mechanism may be used to connect the shell 102 to the core module 100. FIG. 4a shows a hinge 104 and a releasable clip 106, which desirably form a quick release mechanism. The core module 100 has an input element for providing input to a computer. In the mouse device 101 shown, the input element is an optical member 110 for optically detecting the user's input in the form of movement of the mouse on a working surface. In another embodiment, the optical member 110 may be replaced by a tracing ball in a ball cage. The input device 101 may be cordless. If the input device has a cord, the cord may be at least partially stored in the space between the core module 100 and the shell 102, which serves as a cord storage area 114.

One or more user-manipulable members may be coupled with the core module 100 for generating input signals through the core module 100 to the computer. In FIG. 4a, a button 120 is provided on the outer shell 102, and is coupled with the core module 100 by a line 122. Alternatively, the button may be formed as part of the core module 100 and exposed through an opening in the shell 102. In FIG. 4b, a user-manipulable member in the form of a roller 130 is formed as part of the core module 132 and is exposed through an opening in the shell 134 of the input device 136. This eliminates the need for the line 122 as in FIG. 4a for connecting the user-manipulable member and the core module. The core module 132 in FIG. 4b further includes an input element in the form of an optical position sensing element 138. A hinge 135 and a releasable clip 137 detachably couple the shell 134 to the core module 132. In another embodiment shown in FIG. 4c, the shell 134' may be a nondetachable shell that is permanently coupled to the core module 132' by the hinge 135' and attachment clip 137'.

FIG. 5 shows another mouse 170 including a shell 172 that is coupled with the core module 174 by a detachable press fit without clips or other additional coupling mechanisms. A cord 174 is wrapped or wound around a post extending internally and forming a cord-storage area 178 provided internally between the core module 174 and the shell 172. FIG. 5a shows another core module 180 which includes a base 182. A cord 186 is wound around a post extending externally to the base 182 and forming a cord-storage area 184 provided externally in the core module 180 below the shell.

As described above, a single core module can be adapted to different shells or covers having different shapes, sizes, and configurations. For example, the same core module can be adapted for use with either a right-handed shell or a left-handed shell by switching the functions of the buttons (see FIGS. 2a and 2b). In some cases, the same core module can be used with different types of shells, such as shells having different user-manipulable members. For instance, a core module may be adapted to be used with shells having different numbers of buttons and rollers. A core module may be adaptable for use with either a joystick or a touch pad.

Figures 6A, 6B, 6C:
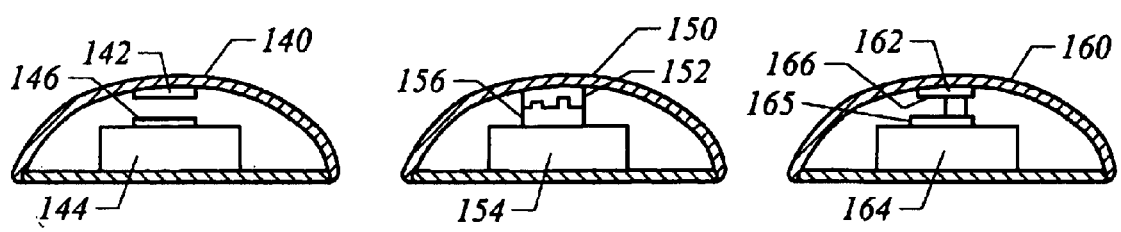
FIG. 6a is a rear cross-sectional view of a mouse device illustrating an optical coupling between the core module and the outer shell according to an embodiment of the invention.
FIG. 6b is a rear cross-sectional view of a mouse device illustrating a mechanical coupling between the core module and the outer shell according to another embodiment of the invention.
FIG. 6c is a rear cross-sectional view of a mouse device illustrating an electrical coupling between the core module and the outer shell according to another embodiment of the invention.

The core module is desirably equipped with a shell recognition or detection element for detecting the characteristics of the shell being coupled thereto. The shell may include a shell identifying element which can be read, scanned, or otherwise detected by the shell detection element. FIGS. 6a–6c illustrate examples of the shell detection feature. In FIG. 6a, the shell 140 includes a shell identifying element 142 in optically readable form such as bar codes. The core module 144 includes an optical member 146 which scans the shell identifying element 142 to detect the characteristics of the shell 140. In FIG. 6b, the shell 150 includes a mechanical shell identifying element 152 and the core module 154 includes a mechanical shell detection element 156 which is mechanically coupled to the shell identifying element 152. The mechanical coupling may activate buttons, switches, or the like to identify the characteristics of the shell 150. FIG. 6c shows a shell 160 having a shell identifying element 162 and a core module 164 having a shell detection element 166 which is electrically coupled with the shell identifying element 162 via one or more electrical lines 168. The electrical coupling activates circuitry or otherwise generates electrical signals that identify the properties of the shell 160.

Figure 7:
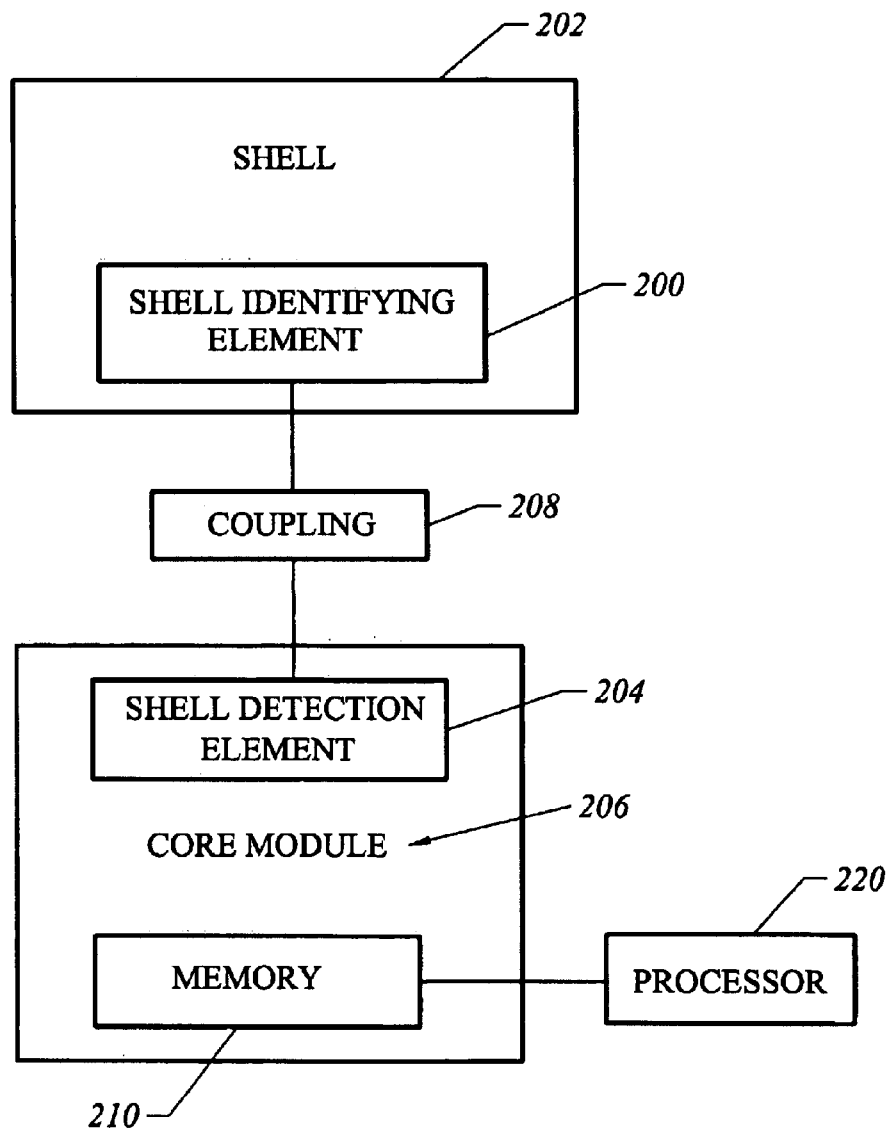
FIG. 7 is a block diagram of an input device according to an embodiment of the present invention.

As shown in FIG. 7, the shell identifying data stored in the shell identifying element 200 of the shell 202 is received by the shell detection element 204 of the core module 206 via the coupling 208. The core module 206 includes a computer-readable medium such as a memory 210 having firmware or software that is used to recognize the characteristics of the shell 202 based on the data detected in the shell identifying element 200. For instance, the memory 210 may include a lookup table that matches specific shell identifying data with specific characteristics which can be used to adapt the firmware or software to the particular shell 202 that is coupled to the core module 206. A processor 220 is coupled to the memory 210 to execute the firmware or software for the input device. In a specific embodiment, the firmware or software is a universal firmware or software that can be adaptable to different input devices without modification or customization. Because the shell has an identifier and features that are transmitted to the computer by the firmware and the software driver performs customization in light of the identifier, no change to the firmware is required. This renders the core module more adaptable and economic to produce in mass.

In some applications, the modular design employing a universal firmware or software in the core module provides an advantageous manufacturing feature, even where the shell is not detachable and does not provide a user feature in terms of adaptability of shell size and shape. The modular design allows different shells to be coupled to the core modules during assembly to provide more efficient assembly line conversion and to facilitate small runs of specialized input devices.

It will be understood that the above-described arrangements of apparatus and methods therefrom are merely illustrative of applications of the principles of this invention and many other embodiments and modifications may be made without departing from the spirit and scope of the invention. For example, different ways of coupling the shell and the core module may be used. Alternative shell identifying mechanisms may be employed. The scope of the invention should, therefore, be determined not with reference to the above description, but instead should be determined with reference to the appended claims along with their full scope of equivalents.

What is claimed is:

1. An adaptable computer input device comprising:
    a core module including an input element for a user to provide input to a computer;
    an outer shell selected from a group of different outer shells which are detachably connectable to the core module to support a user's hand for manipulating the input element of the core module to provide input to the computer, wherein the outer shell includes a shell identifying element and the core module includes a shell recognition element which detects the shell identifying element of the outer shell upon coupling of the outer shell with the core module, and wherein the core module comprises a computer-readable medium having firmware or software which adapts operation of the core module to the outer cover connected thereto in response to detection of the shell identifying element by the cover detection element of the core module;
    wherein the shell recognition element comprises an optical element optically detecting the shell identifying element.

2. The input device of claim 1 wherein the outer shell is detachably connected to the core module by a quick-release mechanism.

3. The input device of claim 2 wherein the quick-release mechanism comprises at least one releasable clip connecting the outer shell with the core module.

4. The input device of claim 1 wherein the outer shell is selected from a group of outer shells having different sizes and shapes.

5. The input device of claim 1 wherein the outer shell is selected from a group of outer shells having different user-manipulable members disposed thereon which are operatively coupled with the core module to allow the user to interact with the core module.

6. The input device of claim 5 wherein the outer shell has at least one user-manipulable member coupled with the core module.

7. The input device of claim 5 wherein the user-manipulable members are selected from the group consisting of buttons, rollers, balls, joysticks, wheels, and touch pads.

8. The input device of claim 1 wherein a cord storage area is provided between the shell and the core module.

9. The input device of claim 1 wherein the input device is cordless.

10. The input device of claim 1 wherein the input element comprises an optical member detecting the user's input.

11. The input device of claim 1 wherein the core module includes at least one user-manipulable member, and wherein the outer shell includes at least one opening exposing at least one user-manipulable member of the core module to permit manipulation of the user-manipulable member by the user.

12. An adaptable input device comprising:
    a core module manipulable by a user to generate an input signal;
    an outer cover detachably connected to the core module to support a user's hand for manipulating the core module to generate the input signal,
    wherein the outer cover includes a cover identifying element and the core module includes a cover detection element which detects the cover identifying element of the outer cover upon coupling of the outer cover with the core module, the outer cover being replaceable by a second outer cover having a second cover identifying element which is detected by the cover detection element of the core module upon coupling of the second outer cover with the core module, and wherein the core module comprises a computer-readable medium having firmware or software which adapts operation of the core module to the outer cover connected thereto in response to detection of the cover identifying element by the cover detection element of the core module;
    wherein the cover detection element comprises an optical element optically detecting the cover identifying element.

13. The input device of claim 12 wherein the cover detection element and the cover identifying element form a mechanical connection upon coupling of the outer cover with the core module.

14. The input device of claim 12 wherein the cover detection element and the cover identifying element form an electrical connection upon coupling of the outer cover with the core module.

15. The input device of claim 12 wherein the cover identifying element identifies one or more user-manipulable members associated with the outer cover.

16. The input device of claim 12 wherein the cover identifying element identifies the outer cover as being configured to a right-hand user or a left-hand user.

17. A method of adapting a core module of an input device to different operations, the method comprising:

selecting an outer shell from a group of outer shells which are detachably connectable to the core module of the input device; and detachably connecting an outer shell to the core module to support a user's hand for manipulating the core module to generate an input signal, the outer shell including a shell identifying element and the core module including a shell detection element, the core module automatically detecting operational information of the outer shell by optically detecting the shell identifying element with the shell detection element upon coupling of the outer shell with the core module and adapting operation of the core module to the outer shell connected thereto in response to detected operational information of the outer shell.

18. The method of claim 17 further comprising disconnecting the outer shell and detachably connecting a second outer shell, the core module automatically detecting operational information of the second outer shell upon coupling of the second outer shell with the core module and adapting operation of the core module to the second outer shell connected thereto in response to detected operational information of the second outer shell.

19. An input device comprising:

a core module manipulable by a user to generate an input signal;

an outer cover connected to the core module to support a user's hand for manipulating the core module to generate the input signal, wherein the outer cover includes a cover identifying element and the core module includes a cover detection element which detects the cover identifying element of the outer cover upon coupling of the outer cover with the core module, and wherein the core module comprises a computer-readable medium having firmware or software which adapts operation of the core module to the outer cover connected thereto in response to detection of the cover identifying element by the cover detection element of the core module, and wherein the cover detection element comprises a optical element optically detecting the cover identifying element.

20. The input device of claim 19 wherein the outer cover is detachably connected to the core module.

21. The input device of claim 19 wherein the cover detection element a the cover identifying element form a mechanical connection upon coupling of the outer cover with the core module.

22. An adaptable computer input device comprising:

a core module including an input element for a user to provide input to a computer;

an outer shell selected from a group of different outer shells which are detachably connectable to the core module to support a user's hand for manipulating the input element of the core module to provide input to the computer, wherein the outer shell includes a shell identifying element and the core module includes a shell recognition element which detects the shell identifying element of the outer shell upon coupling of the outer shell with the core module, and wherein the core module comprises a computer-readable medium having firmware or software which adapts operation of the core module to the outer cover connected thereto in response to detection of the cover identifying element by the cover detection element of the core module;

wherein the shell recognition element comprises an optical element optically detecting the shell identifying element; and wherein the shell identifying element identifies one or more user-manipulable members associated with the outer shell.

23. An adaptable input device comprising:

a core module manipulable by a user to generate an input signal;

an outer cover detachably connected to the core module to support a user's hand for manipulating the core module to generate the input signal, wherein the outer cover includes a cover identifying element and the core module includes a cover detection element which detects the cover identifying element of the outer cover upon coupling of the outer cover with the core module, the outer cover being replaceable by a second outer cover having a second cover identifying element which is detected by the cover detection element of the core module upon coupling of the second outer cover with the core module, and wherein the core module comprises a computer-readable medium having firmware or software which adapts operation of the core module to the outer cover connected thereto in response to detection of the cover identifying element by the cover detection element of the core module;

wherein the cover detection element comprises an optical element optically detecting the cover identifying element; and wherein the core module includes at least one user-manipulable member, and wherein the outer cover includes at least one opening exposing at least one user-manipulable member of the core module to permit manipulation of the user-manipulable member by the user.

* * * * *